(12) United States Patent
Ishii

(10) Patent No.: US 7,954,395 B2
(45) Date of Patent: Jun. 7, 2011

(54) STEERING APPARATUS

(75) Inventor: Nobuhiro Ishii, Maebashi (JP)

(73) Assignee: NSK Ltd., Tokyo (JP)

( * ) Notice: Subject to any disclaimer, the term of this patent is extended or adjusted under 35 U.S.C. 154(b) by 380 days.

(21) Appl. No.: 12/097,624

(22) PCT Filed: Dec. 11, 2006

(86) PCT No.: PCT/JP2006/324695
§ 371 (c)(1),
(2), (4) Date: Jun. 16, 2008

(87) PCT Pub. No.: WO2007/069575
PCT Pub. Date: Jun. 21, 2007

(65) Prior Publication Data
US 2009/0277294 A1    Nov. 12, 2009

(30) Foreign Application Priority Data

Dec. 15, 2005  (JP) .................. 2005-361915
Apr. 4, 2006   (JP) .................. 2006-103015

(51) Int. Cl.
*F16H 35/00*   (2006.01)
*F16H 1/04*    (2006.01)
(52) U.S. Cl. ................... 74/388 PS; 74/422

(58) Field of Classification Search ........... 74/388 PS, 74/422; 180/400, 427
See application file for complete search history.

(56) References Cited

U.S. PATENT DOCUMENTS

| 3,762,240 | A | * | 10/1973 | Adams ............... 74/498 |
| 4,263,817 | A | * | 4/1981 | Taig ................. 74/422 |
| 4,800,770 | A | * | 1/1989 | Kobayashi et al. ... 74/422 |
| 2007/0205041 | A1 | * | 9/2007 | Nishizaki et al. ... 180/446 |

FOREIGN PATENT DOCUMENTS

| DE | 2948246 A1 | 6/1981 |
| JP | 60-23474 U | 2/1985 |
| JP | 1-48190 B2 | 10/1989 |
| JP | 2-86875 U | 7/1990 |
| JP | 11-43055 A | 2/1999 |
| JP | 2004-239652 A | 8/2004 |
| WO | WO2005/108187 | * 11/2005 |

* cited by examiner

*Primary Examiner* — Justin Krause
(74) *Attorney, Agent, or Firm* — Sughrue Mion, PLLC

(57) ABSTRACT

In the event that a moment in a bending direction is generated in a pinion shaft, for example, when a vehicle is involved in a collision or the like, since a bending facilitating portion which is a circumferential groove 111e bends, stress is concentrated hereon, and no large bending stress is generated in any case between a rolling bearing 102 and a support member 104. Consequently, an excessively large bending force is transmitted in no case to a four point contact type ball bearing 103.

7 Claims, 5 Drawing Sheets

STEERING APPARATUS

TECHNICAL FIELD

The present invention relates to a steering apparatus, and more particularly to a rack and pinion type steering apparatus.

BACKGROUND ART

There is known as a vehicle steering apparatus a so-called rack and pinion type steering apparatus which is configured such that steering effort imparted to a steering wheel is transmitted to a rack shaft via a pinion shaft, so as to cause the rack shaft to reciprocate within a predetermined range to thereby steer road wheels (refer to Patent Document No. 1).
Patent Document No. 1: Japanese Patent Unexamined Publication JP-A-11-43055

DISCLOSURE OF THE INVENTION

Problem that the Invention is to Solve

Incidentally, in a conventional rack and pinion type steering apparatus, when an excessively large external force in a radial direction is exerted on a pinion shaft, a bending force is exerted on the pinion shaft, as a result of which an excessively large radial load is exerted on a bearing which supports the pinion shaft. In the rack and pinion type steering apparatus, however, since it is general practice to use a four point contact type ball bearing which is free from axial and radial looseness, in the event that looseness is produced in the four point contact type ball bearing by an excessively large radial load which is equal to or larger than a permissible load capacity being exerted thereon, there is caused a fear that the generation of abnormal noise or the like is called for.

Means for Solving the Problem

The invention has been made in view of the problem inherent in the related art described above, and an object thereof is to provide a steering apparatus which can prevent the exertion of excessively large load to a bearing which supports a pinion shaft.

A first steering apparatus according to the invention includes:
a housing;
a pinion shaft on an outer circumference of which pinion gear teeth are formed;
a bearing which supports rotatably the pinion shaft on the housing; and
a rack shaft having rack gear teeth which mesh with the pinion gear teeth and adapted to reciprocate relative to the housing in response to rotation of the pinion shaft to thereby steer road wheels, wherein
the pinion shaft includes a bending facilitating portion which is easiest to bend when subjected to an external force in a bending direction in a location lying closer to an outer end portion side than the bearing.

A second steering apparatus according to the invention includes:
a housing;
a pinion shaft on an outer circumference of which pinion gear teeth are formed;
a bearing which supports rotatably the pinion shaft on the housing;
a rack shaft having rack gear teeth which mesh with the pinion gear teeth and adapted to reciprocate relative to the housing in response to rotation of the pinion shaft to thereby steer road wheels; and
a suppressing unit which suppresses through contact with the pinion shaft further bending thereof in a location lying closer to the contact point, when the pinion shaft is subjected to an external force in a bending direction to bend.

Advantage of the Invention

According to the first steering apparatus of the invention, since the pinion shaft has the bending facilitating portion which is easiest to bend when it is subjected to the external force in the bending direction in the location lying closer to the outer end portion side than the bearing, when subjected to such an external force, by the bending facilitating portion bending first, the generation of excessively large stress in the location lying closer to the inner end portion side than the bending facilitating portion of the pinion shaft (including a mounting portion of the bearing) can be suppressed. Note that "easiest to bend" denotes a location having a maximum bending angle when the pinion shaft is subjected to the external force in the bending direction in such a state that the pinion shaft is assembled in place. In addition, the bending facilitating portion means simply here that the portion constitutes a location which is easy to bend and does not mean that the portion constitutes a location which is easy to fail.

It is preferable that the bending facilitating portion is a location having a smallest cross sectional area of the pinion shaft which is provided between a circumferential groove with which a cylindrical member, which is clamped to fix in place the bearing which supports the pinion shaft, is brought into engagement and a joint connecting portion (for example, spline teeth formed on the pinion shaft) which transmits steering effort to the pinion shaft, because the bending facilitating portion becomes easy to bend when subjected to the external force in the bending direction.

It is preferable that a dust cover is mounted on the circumferential groove, because it can suppress the effect of scattering dust.

It is preferable that a carburizing treatment is applied to the pinion shaft excluding at least the bending facilitating portion, because the bending facilitating portion becomes easier to bend when subjected to the external force in the bending direction. Note that a case is included where no carburizing treatment is applied to a whole area of the pinion shaft which lies closer to the outer end portion side than the bearing.

According to the second steering apparatus of the invention, since the suppressing means is provided for, when the pinion shaft is subjected to the external force in the bending direction to bend, suppressing through contact with the pinion shaft further bending thereof in the location lying closer to the contact point, when subjected to the external force in the bending direction, the generation of excessively large stress in the location which lies closer to the inner end portion side than the contact point of the pinion shaft can be suppressed by the suppressing means suppressing a bend equal to or more than a predetermined angle.

It is preferable that the suppressing means is a support member which is mounted on the housing and which has a predetermined clearance relative to the pinion shaft in a direction which intersects an axis at right angles in the location lying closer to the outer end portion side than the bearing.

Although it is preferable that the predetermined clearance is small from the viewpoint of suppressing stress, in the event that the clearance becomes too small, the assemblage becomes difficult, and sliding resistance is also increased. Then, it is preferable that an appropriate value is determined for the predetermined clearance based on variation in dimensions due to manufacturing error.

It is preferable that no carburizing treatment is applied to the area lying closer to the outer end portion side than the contact point, because the pinion shaft becomes easy to bend.

Figure 1:
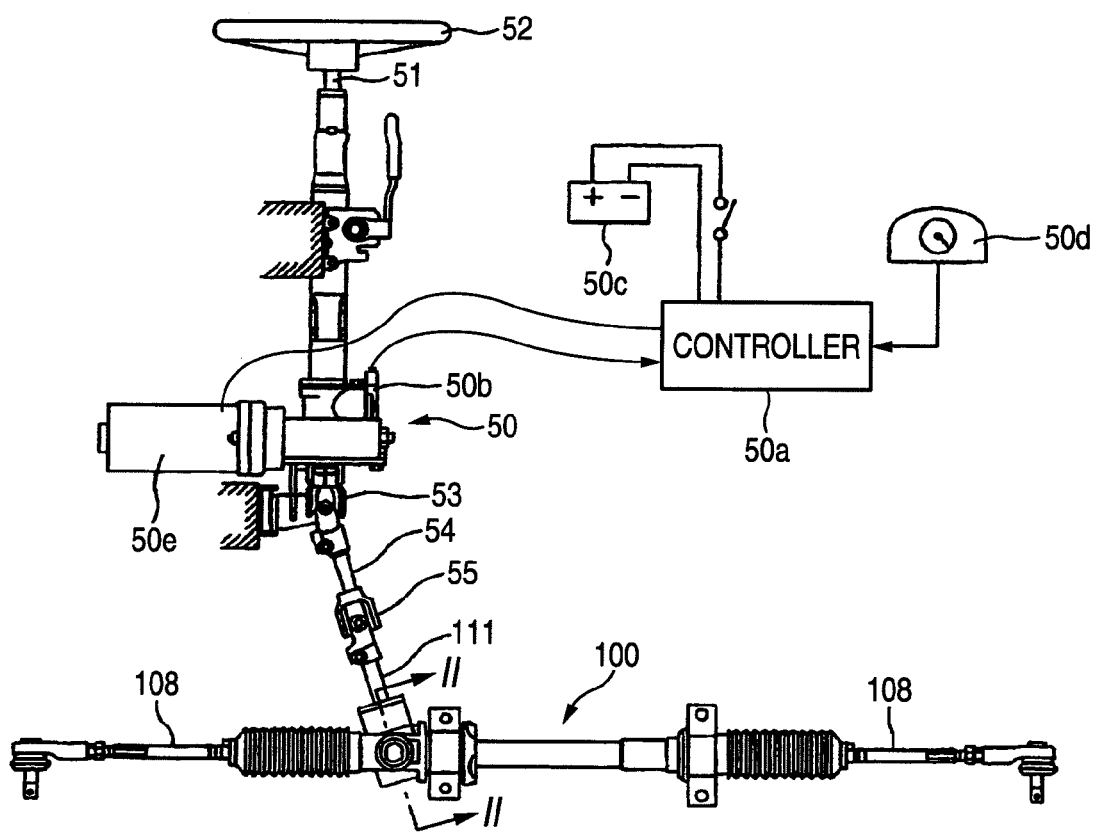
FIG. 1 A schematic diagram showing a state in which a rack and pinion type steering apparatus according to an embodiment is mounted on a vehicle FIG. 2 A sectional view resulting when the configuration shown in FIG. 1 is taken along the line II-II and seen in a direction indicated by arrows.

DESCRIPTION OF REFERENCE NUMERALS 50 electric power steering apparatus;
50a controller;
50b torque detector;
50c battery;
50d speed detector;
50e electric motor;
51 steering shaft;
52 steering wheel;
53 universal joint;
54 intermediate shaft;
55 universal joint;
100 steering apparatus;
101 housing;
101a stepped portion;
101b small cylindrical portion;
101c female thread;
102 rolling bearing;
103 four point contact type ball bearing;
104 support member;
104a support portion;
106 seal member;
107 cylindrical member;
108, 108 tie rod;
111 pinion shaft;
111a pinion gear teeth;
111b flange portion;
111c circumferential groove;
111d spline teeth;
111e circumferential groove
112 rack shaft;
112a rack gear teeth;
114 rack support;
114a groove;
115 shaft;
116 rolling bearing;
117 roller;
118 threaded member;
119 spring member;
120 lock nut;
130 cover member;
130a engagement portion;
130b covering portion

BEST MODE FOR CARRYING OUT THE INVENTION

Hereinafter, steering apparatuses according to embodiments of the invention will be described by reference to the drawings.

Figure 2:
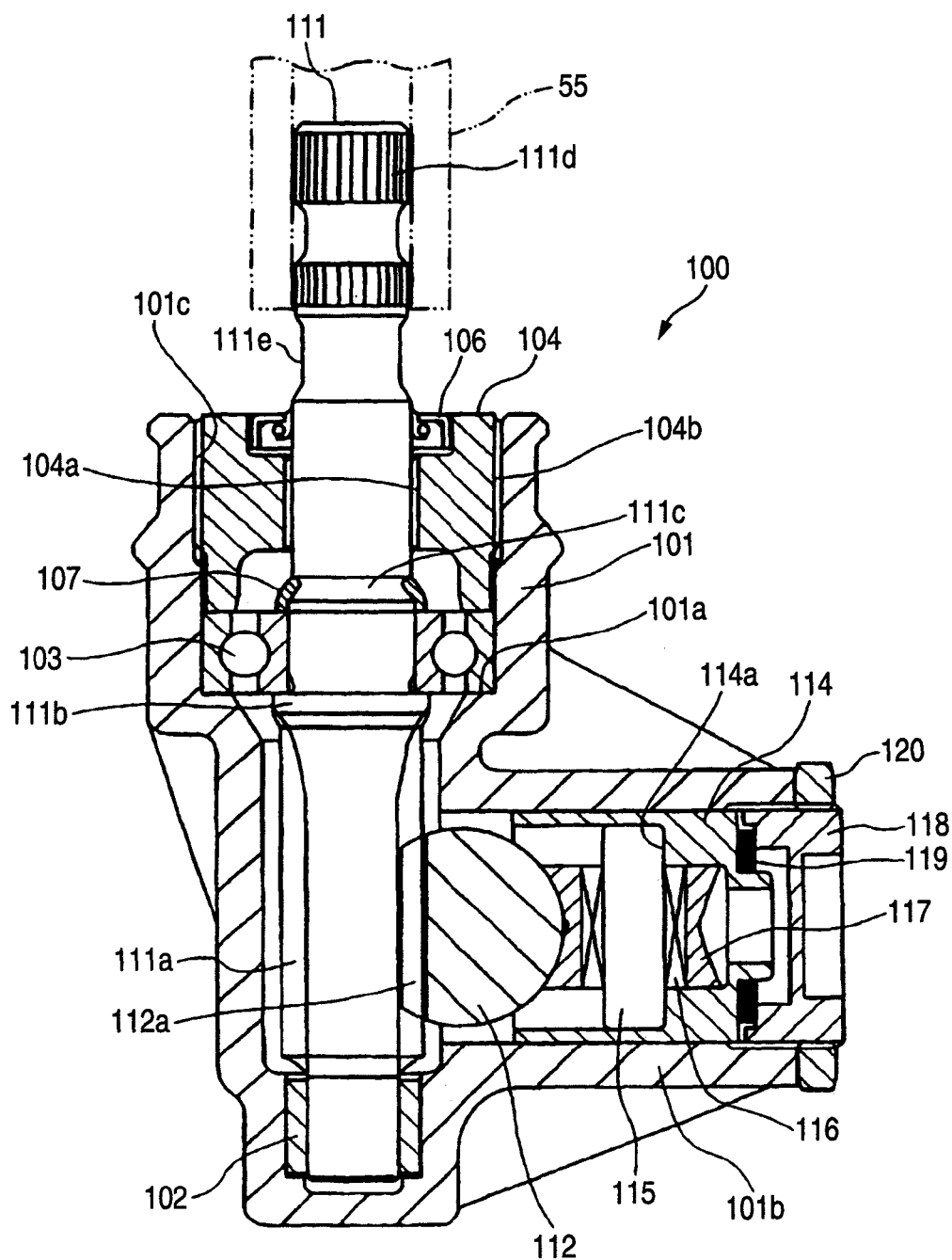

FIG. 1 is a schematic diagram showing a state in which a rack and pinion type steering apparatus according to an embodiment is equipped on a vehicle. FIG. 2 is a diagram resulting when the configuration shown in FIG. 1 is taken along the line II-II and seen in a direction indicated by arrows.

In FIG. 1, in an electric power steering apparatus 50 fixed to a vehicle, a steering wheel 52 is mounted at an upper end of a steering shaft 51. On the other hand, a lower end of the steering shaft 51 is coupled to an intermediate shaft 54 via a universal joint 53, and the intermediate shaft 54 is coupled to a pinion shaft 111 of a steering apparatus 100 via a universal joint 55.

A controller 50a of the electric power steering apparatus 50 is connected to a torque detector 50b, a battery 50c and a speed detector 50d and is made to control the driving of an electric motor 50e in a mode, which will be described later, so as to output an appropriate assisting steering torque to the steering shaft 51.

In FIG. 2, the pinion shaft 111 is inserted into a housing 101, and a lower end thereof is rotatably supported relative to the housing 101 by a rolling bearing 102, while a center thereof is rotatably supported relative to the housing 101 by a four point contact type ball bearing 103.

To describe more specifically, an outer ring of the four point contact type ball bearing 103 is brought into abutment with a stepped portion 101a formed on an inner circumference of the housing 101. A cylindrical support member 104 is mounted by thread fitting a male thread 104b in a female thread 101c formed on the housing 101 in a location lying outwards (upwards in the figure) of the four point contact type ball bearing 103, and an inner end thereof is brought into abutment with an outer ring of the four point contact type ball bearing 103. Although an inner circumference of the support member 104 is expanded diametrically at both ends thereof, a central portion is made to project towards an outer circumference of the pinion shaft 111 so as to form a support portion 104a which defines a small clearance relative to the outer circumference of the pinion shaft 111. In addition, a seal member 106 adapted to contact the outer circumference of the pinion shaft 111 is disposed on the inner circumference of the support member 104 at the outer end thereof.

On the other hand, an inner ring of the four point contact type ball bearing 103 is brought into abutment with a flange portion 111b of the pinion shaft 111. A bearing mounting circumferential groove 111c is formed on the pinion shaft 111 in a location lying outwards (upwards in the figure) of the flange portion 111b in such a manner as to hold the four point contact type ball bearing 103 therebetween, and the other end of a cylindrical member 107 which is brought into engagement with the circumferential groove 111c by being clamped at one end thereof is brought into abutment with the inner ring of the four point contact type ball bearing 103. Through the configuration that has been described above, the pinion shaft 111 is mounted on the housing 101 via the four point contact type ball bearing 103 in such a manner as to be prohibited from moving in the axial direction relative to the housing 101. In addition, spline teeth 111d are formed at an upper end of the pinion shaft 111 as a joint connecting portion which is coupled to the universal joint 55 to which steering effort is transmitted, and a circumferential groove 111e which makes up a bending facilitating portion is formed on the outer circumference of the pinion shaft 111 in a location lying between the spline teeth 111d and the seal member 106. The outside diameter (or the sectional area) of the circumferential groove 111e preferably becomes the smallest between pinion gear teeth 111a and the spline teeth 111d of the pinion shaft 111.

Figure 3:
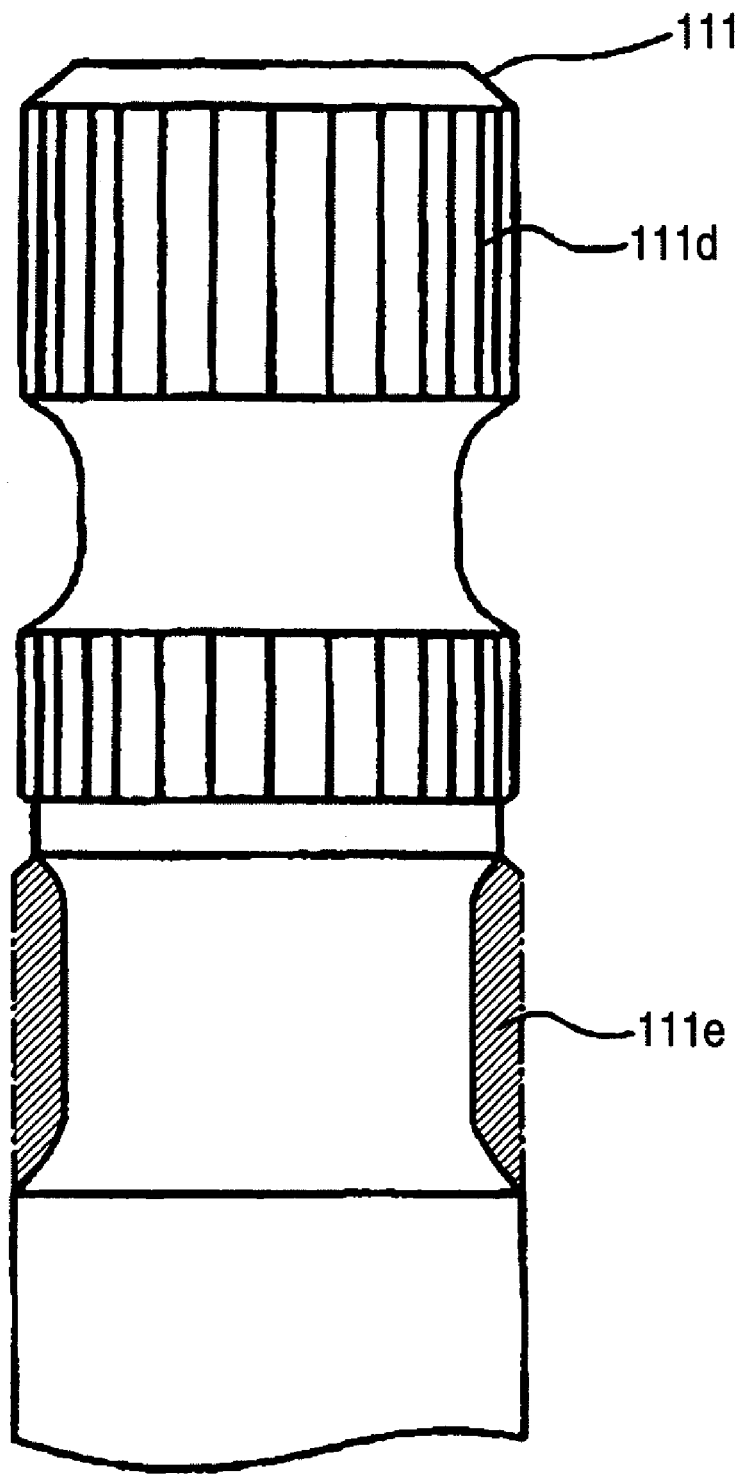
FIG. 3 A diagram showing an end portion of a pinion shaft 111 in an enlarged manner.
Figure 4:
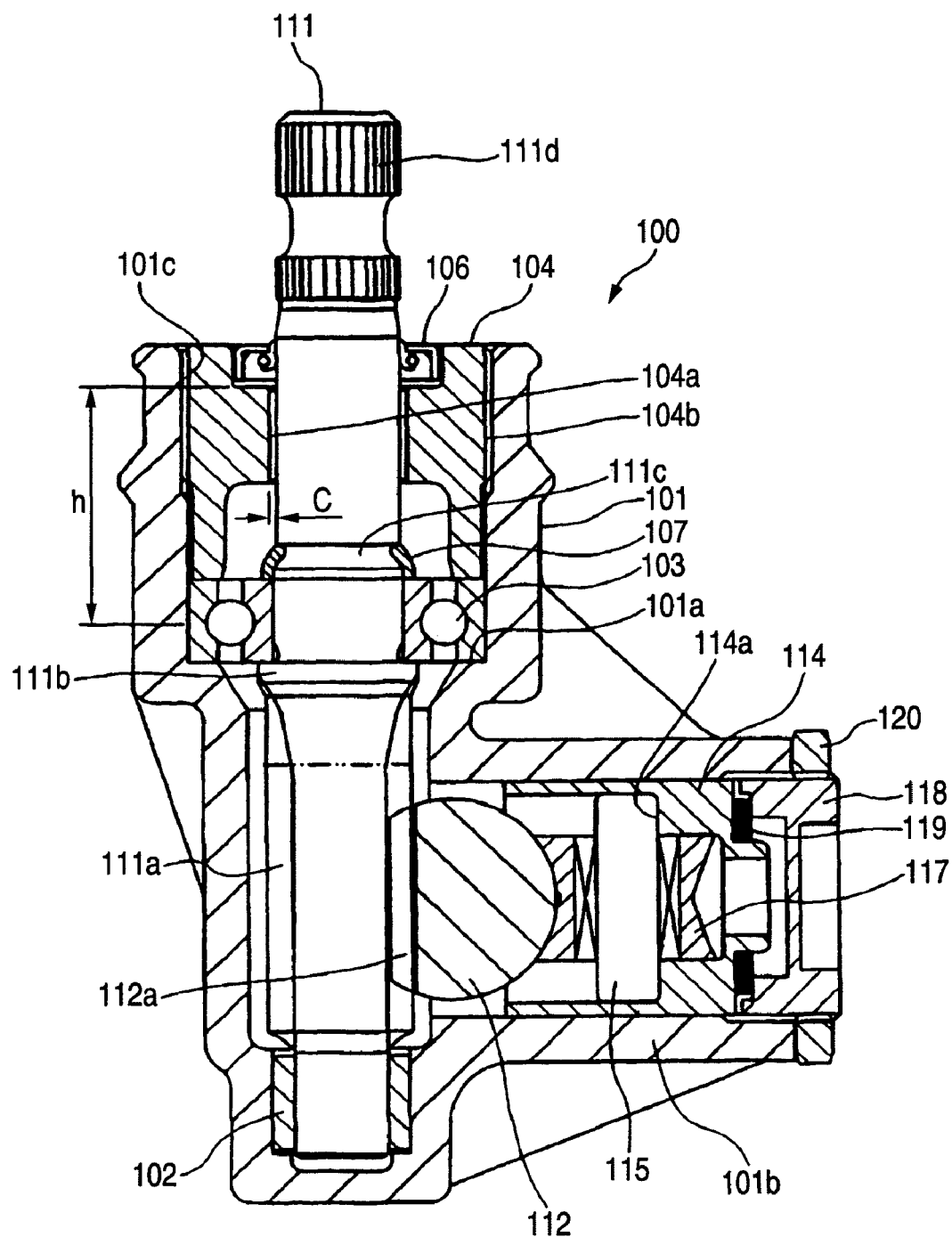
FIG. 4 A sectional view, similar to FIG. 2, of a rack and pinion type steering apparatus according to a second embodiment.

FIG. 3 is a diagram showing the end portion of the pinion shaft 111 in an enlarged manner. When manufacturing the pinion shaft 111, after a carburizing treatment is applied to the whole of the pinion shaft 111, only a location where double hatching is applied is cut off through cutting, whereby the circumferential groove 111e can be formed. By adopting this manufacturing procedure, of the carburized layer formed on the surface of the pinion shaft 111, only the carburized layer corresponding to the surface of the circumferential groove 111e is removed through cutting, whereby when subjected to an external force, the pinion shaft 111 becomes easier to bend at the circumferential groove 111e. In addition, the outside diameter of the location corresponding to the circumferential groove 111e before machining is preferably made as large as possible, and the amount of cutting is preferably made constant in the axial direction. In addition, the same advantage can be obtained by performing a circumferential groove 111e and applying a carburizing treatment entirely after a carburization preventing agent has been applied to the inside of the circumferential groove 111e. Only a non-carburization applied portion may be provided without forming the circumferential groove 111e.

In FIG. 2, pinion gear teeth 111a are formed between the rolling bearing 102 and the four point contact type ball bearing 103. A rack shaft 112 is passed through the housing 101 in such a manner as to extend in a direction which intersects the pinion shaft 111 at right angles (a direction normal to the surface of a sheet of paper on which FIG. 2 is drawn). The rack shaft 112 has a substantially semi-circular cross section, and rack gear teeth 112a are formed on a chord side (a flat side) thereof. A back side of the rack gear teeth 112a in the rack shaft 112 is formed into a circular cylindrical shape. The rack gear teeth 112a mesh with the pinion gear teeth 111a. The rack shaft 112 is made to move in its longitudinal direction by virtue of rotation of the pinion shaft 111.

A small cylindrical portion 101b provided on the housing 101 extends outwards at right angles from the back side of the rack shaft 112. A hollow circular cylindrical rack support 114 is disposed in an interior of the small cylindrical portion 101b. A groove 114a is formed on an inner end side of the rack support 114, and a shaft 115 is fixedly disposed within the groove 114a. A roller 117 having an hourglass-like cross section is supported rotatably on an outer circumference of the shaft 115 via a rolling bearing 116 in such a manner as to freely roll along the cylindrical surface of the rack shaft 112.

A threaded member 118 is thread fitted in an inner circumference of an end portion of the small cylindrical portion 101b. In addition, a spring member 119 is disposed between the threaded member 118 and the rack support 114, and the spring member 119 is made to exhibit a predetermined biasing force according to an amount by which the threaded member 118 is threaded into the small cylindrical portion 101b. Furthermore, a lock nut member 120 is provided to prevent the threaded member 118 from being loosened from the small cylindrical portion 101b.

Next, the operation of the electric power steering apparatus according to the embodiment will be described hereinbelow by reference to FIG. 1. When the driver turns the steering wheel 52, the steering shaft 51, the universal joint 53, the intermediate shaft 54, the universal joint 54 and the pinion shaft 111 rotate, whereby the rack shaft 112 is moved in a predetermined direction, whereby the steering effort is transmitted to a steering mechanism, not shown, via tie rods 108, 108 which are coupled to ends of the rack shaft 112, so as to steer road wheels. The rack support 114 acts to suppress the separation of the pinion shaft 111 from the rack shaft 112 by resisting an impact force generated between the pinion gear teeth 111a and the rack gear teeth 112a at stroke ends or the like.

In this case, the value of torque detected by the torque detector 50b is sent to the controller 50a, where it is compared with a predetermined value which is determined in consideration of an output of the speed detector 50d or the like. In the event that the torque so detected exceeds the predetermined value, since it means a case where assisting steering effort is necessary, power of the battery 50c is supplied to the electric motor 50e to drive the electric motor 50e. The electric motor 50e so driven then outputs assisting torque to the steering shaft 51 to thereby cause the rack shaft 112 to move in the axial direction. In the event that the value of torque detected by the torque detector 50b is lower than the predetermined value, since no assisting steering effort is necessary, the electric motor 50e is not driven.

Here, in the event that a moment in a bending direction is generated in the pinion shaft 111, for example, due to the vehicle being involved in a collision or the like, since the circumferential groove 111e which constitutes the bending facilitating portion bends largest, stress is concentrated thereon, whereby large bending stress is generated in no case between the rolling bearing 102 and the support member 104. Consequently, no excessively large force is transmitted to the four point contact type ball bearing 103. Note that although bending is generated also in the bearing mounting circumferential groove 111c when subjected to the external force, when the bearing mounting circumferential groove 111c bends to some extent, a support portion 104a of the support member 104 is brought into abutment with the pinion shaft 111, whereby any further bending at the circumferential groove 111c is prevented.

FIG. 2 is a diagram, similar to FIG. 2, of a steering apparatus according to a second embodiment. In this embodiment, a circumferential groove as a bending facilitating portion is not provided on a pinion shaft 111. Instead, a clearance C between an inner circumferential surface of a support portion 104a of a support member 104 and an outer circumferential surface of the pinion shaft 111 which corresponds thereto is set to a predetermined value in consideration of variation in dimensions due to manufacturing error. Since other configurations than this are similar to those of the embodiment that has been described above, like reference numerals will be imparted thereto, and the description thereof will be omitted.

To describe different points more specifically, assuming that a distance from the center of a four point contact type ball bearing 103 to the support portion 104a which makes up a pressing means is h, dimensions of respective portions are determined in such a manner that the following expression is established.

$$0.1° \leq \tan^{-1}(C/h) \leq 1.2°$$

Namely, according to this embodiment, for example, when the vehicle is involved in a collision or the like, in the event that a moment in a bending direction is generated in the pinion shaft 111, after the inner circumferential surface of the support portion 104a of the support member 104 and the outer circumferential surface of the pinion shaft 111 which corresponds thereto are brought into contact with each other, since a fulcrum of bending force exerted on the pinion shaft 111 moves from the four point contact type ball bearing 103 to the support portion 104a, stress generated in the pinion shaft 111 becomes higher on an outside of the support member 104, whereby large bending stress is generated in no case between the rolling bearing 102 and the support member 104. As this occurs, a bending angle θ of the pinion shaft 111 about the four point contact type ball bearing 103 can be suppressed to 1.2° or smaller at the most. Consequently, no excessively large force is transmitted to the four point contact type ball bearing 103.

Figure 5:
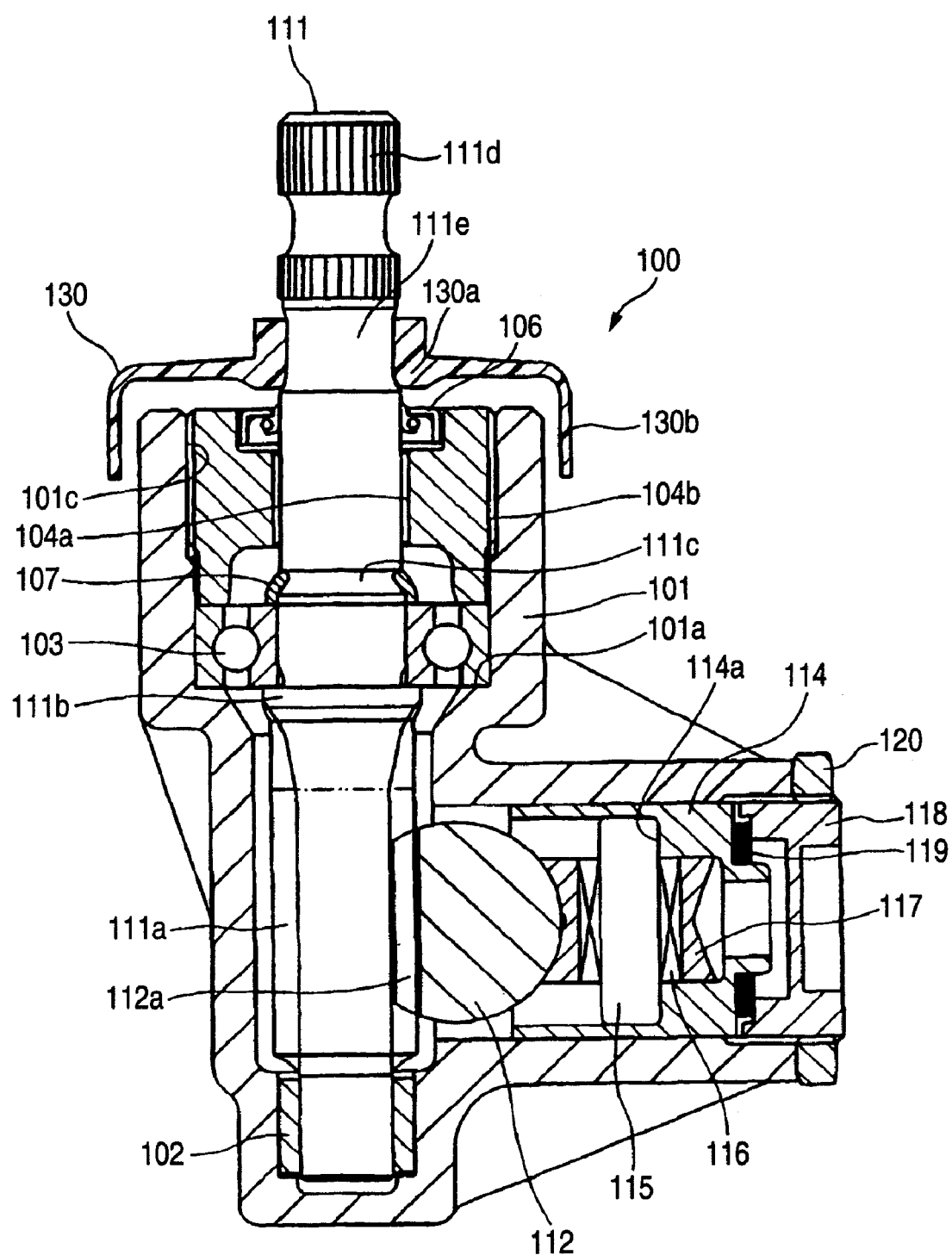
FIG. 5 A sectional view, similar to FIG. 2, of a rack and pinion type steering apparatus according to a third embodiment.

FIG. 5 is a sectional view, similar to FIG. 2, of a rack and pinion type steering apparatus according to a third embodiment. In this embodiment, a dust cover 130 is mounted on a circumferential groove which is formed on a pinion shaft 111 as a bending facilitating portion. Since other configurations than this are similar to those of the embodiments that have been described above, like reference numerals will be given thereto, and the description thereof will be omitted.

The dust cover 130 made of rubber or the like has a hollow circular cylindrical engagement portion 130a having an inside diameter smaller than the outside diameter of a circumferential groove 111e in its free state and mounted on a circumference of the circumferential groove 111e and an umbrella-like covering portion 130b which extends radially outwards from the engagement portion 130a to cover the vicinity of an upper portion of the housing 101.

In particular, in an installation example in which the rack and pinion type steering apparatus is disposed outside a passenger compartment, there is a fear that when dust flying from the outside sticks to or is accumulated on a seal surface on which a seal member slides, the performance of the seal member is deteriorated. According to this embodiment, since the cover member 130 is provided in such a manner as to cover a seal member 106 with the covering portion 130b, the adhesion of scattering dust or water to the seal surface can be suppressed, whereby the sealing performance of the seal member 106 is allowed to be exhibited for a long period of time. In addition, in assembling the cover member 130, the engagement portion 130a only has to be passed over the pinion shaft 111 from an upper end thereof while being elastically deformed to thereby be fitted on the diametrically reduced circumferential groove 111e. Furthermore, since the pinion shaft 111 can be fixed by making use of the elastic force of the engagement portion 130a, a displacement due to vibrations can be prevented without using a separate fixture, thereby making it possible to reduce the number of components involved.

Thus, while the invention has been described by reference to the embodiments, the invention is not construed as being limited to the embodiments, and hence, the invention can of course be changed or improved as required without damaging the spirit thereof. For example, the rack and pinion type steering apparatus of the invention does not necessarily have to be combined with the electric power steering apparatus but may be combined with a hydraulic power steering apparatus, or may be used solely without being combined with a power steering apparatus.

While the invention has been described in detail and by reference to the specific embodiments, it is obvious to those skilled in the art to which the invention pertains that the invention can be changed or modified variously without departing from the spirit and scope thereof.

This patent application is based on Japanese Patent Application (No. 2005-361915) filed on Dec. 15, 2005 and Japanese Patent Application (No. 2006-103015) filed on Apr. 4, 2006, and all the contents thereof are incorporated herein by reference.

INDUSTRIAL APPLICABILITY

According to the steering apparatus of the invention, the pinion shaft has the bending facilitating portion which becomes easiest to bend when subjected to an external force in a bending direction in the location lying closer to the outer end portion side than the bearing. Consequently, when subjected to such an external force, by the bending facilitating portion bending first, the generation of excessively large stress in the location on the pinion shaft which lies closer to the inner end portion side than the bending facilitating portion (including the mounting portion of the bearing) can be suppressed.

The invention claimed is:

1. A steering apparatus comprising:
a housing;
a pinion shaft on an outer circumference of which pinion gear teeth are formed;
a bearing which supports rotatably the pinion shaft on the housing; and
a rack shaft having rack gear teeth which mesh with the pinion gear teeth and adapted to reciprocate relative to the housing in response to rotation of the pinion shaft to thereby steer road wheels, wherein
the pinion shaft comprises a bending facilitating portion which is easiest to bend when subjected to an external force in a bending direction in a location lying closer to an outer end portion side than the bearing, and
a suppressing unit which suppresses, through contact with the pinion shaft at a contact point, further bending of the pinion shaft in a location lying closer to the contact point when the pinion shaft is subjected to an external force in a bending direction tending to bend the pinion shaft;
wherein the suppressing unit is a support member which is mounted on the housing and which has a predetermined space relative to the pinion shaft in a direction which intersects an axis at right angles in the location lying closer to the outer end portion side than the bearing.

2. The steering apparatus as set forth in claim 1, wherein the pinion shaft comprises:
a circumferential groove with which a circular cylindrical portion which is clamped to fix the bearing which supports the pinion shaft is brought into engagement; and
a joint connecting portion which transmits steering effort to the pinion shaft, and
the bending facilitating portion is provided between the circumferential groove and the joint connecting portion and constitutes a location on the pinion shaft which has a smallest cross sectional area.

3. The steering apparatus as set forth in claim 2, wherein a dust cover is mounted on the bending facilitating portion.

4. The steering apparatus as set forth in claim 1, wherein a carburizing treatment is applied to the pinion shaft excluding at least the bending facilitating portion.

5. The steering apparatus as set forth in claim 1, wherein the predetermined clearance is determined based on variation in dimensions due to manufacturing error.

6. The steering apparatus as set forth in claim 1, wherein no carburizing treatment is applied to the pinion shaft in a location lying closer to the outer end portion side than the contact point.

7. The steering apparatus as set forth in claim 1, further comprising a seal member disposed adjacent the support member.

* * * * *